US011113928B2

(12) United States Patent
Oyama et al.

(10) Patent No.: US 11,113,928 B2
(45) Date of Patent: Sep. 7, 2021

(54) INFORMATION PROCESSOR

(71) Applicant: Universal Entertainment Corporation, Tokyo (JP)

(72) Inventors: Masaki Oyama, Tokyo (JP); Toshikazu Jinnouchi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 106 days.

(21) Appl. No.: 16/534,209

(22) Filed: Aug. 7, 2019

(65) Prior Publication Data

US 2020/0074799 A1 Mar. 5, 2020

(30) Foreign Application Priority Data

Aug. 29, 2018 (JP) ............................ JP2018-160073

(51) Int. Cl.

*A63F 9/24* (2006.01)
*A63F 11/00* (2006.01)
*G06F 13/00* (2006.01)
*G06F 17/00* (2019.01)
*G07F 17/32* (2006.01)

(52) U.S. Cl.

CPC ...... *G07F 17/3244* (2013.01); *G07F 17/3213* (2013.01); *G07F 17/3225* (2013.01)

(58) Field of Classification Search

USPC ........................ 463/1, 10, 12, 16, 20, 22, 25
See application file for complete search history.

(56) References Cited

U.S. PATENT DOCUMENTS

2017/0200346 A1* 7/2017 Fujisawa ............ G07F 17/3244

* cited by examiner

*Primary Examiner* — Adetokunbo O Torimiro
(74) *Attorney, Agent, or Firm* — Potomac Law Group, PLLC; Kenneth Fagin

(57) ABSTRACT

In the information processor, the following processes are executed: (a) executing first random determination of determining whether to set the high-probability game random determination table; (b) when it is determined in the first random determination not to set the high-probability game random determination table, setting the normal game random determination table as a random determination table used in the normal game and executing second random determination based on the normal game random determination table; (c) when it is determined in the first random determination to set the high-probability game random determination table, setting the high-probability game random determination table as a random determination table used in the normal game and executing third random determination based on the high-probability game random determination table; and (d) when the predetermined benefit is to be awarded as a result of the second random determination or the third random determination, awarding the predetermined benefit.

11 Claims, 15 Drawing Sheets

FIG.5

SYMBOL ARRAYS OF NORMAL GAME VIDEO REELS

| | REEL 1 | REEL 2 | REEL 3 | REEL 4 | REEL 5 |
|---|---|---|---|---|---|
| 0 | HEART | 9 | CHERRY | 9 | KING |
| 1 | CHERRY | JACK | KING | JACK | ACE |
| 2 | 7 | HEART | 9 | CHERRY | BELL |
| 3 | JACK | 7 | ACE | 9 | KING |
| 4 | KING | 10 | BELL | JACK | WATERMELON |
| 5 | WATERMELON | QUEEN | 10 | HEART | WATERMELON |
| 6 | 10 | ACE | WATERMELON | KING | QUEEN |
| 7 | BELL | BELL | 10 | JACK | HEART |
| 8 | JACK | JACK | CHERRY | 10 | JACK |
| 9 | 9 | WATERMELON | 10 | BELL | 9 |
| 10 | KING | 9 | WATERMELON | 9 | CHERRY |
| 11 | JACK | CHERRY | JACK | QUEEN | 10 |
| 12 | ACE | ACE | KING | ACE | 7 |
| 13 | BELL | QUEEN | HEART | 9 | ACE |
| 14 | GRAPE | GRAPE | GRAPE | GRAPE | BONUS |
| 15 | BANANA | BANANA | BANANA | BANANA | BONUS |
| 16 | QUEEN | 9 | 7 | QUEEN | BELL |
| 17 | HEART | KING | 10 | 7 | 9 |
| 18 | ACE | BELL | 7 | CHERRY | KING |
| 19 | 10 | ACE | CHERRY | HEART | CHERRY |
| 20 | 9 | QUEEN | 10 | ACE | ACE |
| 21 | 9 | WATERMELON | WILD | KING | BELL |
| 22 | CHERRY | 10 | QUEEN | WATERMELON | QUEEN |
| 23 | JACK | 9 | 10 | 10 | ACE |
| 24 | 10 | QUEEN | CHERRY | BELL | HEART |
| 25 | WATERMELON | CHERRY | ACE | 9 | WATERMELON |
| 26 | PLUM | PLUM | PLUM | PLUM | JACK |
| 27 | 7 | ACE | QUEEN | 10 | 10 |
| 28 | HEART | 9 | 9 | CHERRY | ACE |
| 29 | ACE | 7 | BELL | KING | CHERRY |
| 30 | | WILD | WILD | WILD | |

FIG.6

SYMBOL ARRAYS OF HIGH-PROBABILITY GAME VIDEO REELS

| | REEL 1 | REEL 2 | REEL 3 | REEL 4 | REEL 5 |
|---|---|---|---|---|---|
| 0 | HEART | 9 | CHERRY | 9 | KING |
| 1 | CHERRY | JACK | KING | JACK | ACE |
| 2 | 7 | HEART | 9 | CHERRY | BELL |
| 3 | JACK | 7 | ACE | 9 | KING |
| 4 | KING | 10 | BELL | JACK | WATERMELON |
| 5 | WATERMELON | QUEEN | 10 | HEART | WATERMELON |
| 6 | 10 | ACE | WATERMELON | KING | QUEEN |
| 7 | BELL | BELL | 10 | JACK | HEART |
| 8 | JACK | JACK | CHERRY | 10 | JACK |
| 9 | 9 | WATERMELON | 10 | BELL | 9 |
| 10 | KING | 9 | WATERMELON | 9 | CHERRY |
| 11 | JACK | CHERRY | JACK | QUEEN | 10 |
| 12 | ACE | ACE | KING | ACE | 7 |
| 13 | BELL | QUEEN | HEART | 9 | ACE |
| 14 | GRAPE | GRAPE | GRAPE | GRAPE | BONUS |
| 15 | BANANA | BANANA | BANANA | BANANA | BONUS |
| 16 | QUEEN | 9 | 7 | QUEEN | BELL |
| 17 | HEART | KING | 10 | 7 | 9 |
| 18 | ACE | BELL | 7 | CHERRY | KING |
| 19 | 10 | ACE | CHERRY | HEART | CHERRY |
| 20 | 9 | QUEEN | 10 | ACE | ACE |
| 21 | 9 | WATERMELON | WILD | KING | BELL |
| 22 | CHERRY | 10 | QUEEN | WATERMELON | QUEEN |
| 23 | JACK | 9 | 10 | 10 | ACE |
| 24 | 10 | QUEEN | CHERRY | BELL | HEART |
| 25 | WATERMELON | CHERRY | ACE | 9 | WATERMELON |
| 26 | PLUM | PLUM | PLUM | PLUM | BONUS |
| 27 | 7 | ACE | QUEEN | 10 | 10 |
| 28 | HEART | 9 | 9 | CHERRY | ACE |
| 29 | ACE | 7 | BELL | KING | CHERRY |
| 30 | PLUM | GRAPE | WILD | BANANA | BONUS |

FIG.7

SYMBOL ARRAYS OF FREE GAME VIDEO REELS

| | REEL 1 | REEL 2 | REEL 3 | REEL 4 | REEL 5 |
|---|---|---|---|---|---|
| 0 | HEART | 9 | 7 | 9 | KING |
| 1 | CHERRY | JACK | KING | JACK | ACE |
| 2 | 7 | HEART | 9 | CHERRY | BELL |
| 3 | JACK | 7 | ACE | 9 | KING |
| 4 | KING | 10 | BELL | JACK | WATERMELON |
| 5 | WATERMELON | QUEEN | QUEEN | HEART | WATERMELON |
| 6 | 10 | ACE | WATERMELON | KING | QUEEN |
| 7 | BELL | BELL | 10 | JACK | HEART |
| 8 | JACK | JACK | CHERRY | 10 | JACK |
| 9 | 9 | WATERMELON | 10 | BELL | 9 |
| 10 | KING | 9 | WATERMELON | 9 | CHERRY |
| 11 | QUEEN | CHERRY | JACK | QUEEN | 10 |
| 12 | ACE | ACE | KING | ACE | 7 |
| 13 | BELL | KING | HEART | WATERMELON | ACE |
| 14 | GRAPE | GRAPE | GRAPE | GRAPE | BONUS |
| 15 | BANANA | BANANA | BANANA | BANANA | BONUS |
| 16 | PLUM | PLUM | PLUM | PLUM | BONUS |

FIG.8

SYMBOL COMBINATION TABLE

| SYMBOL | GRAPHICS | 1 | 2 | 3 | 4 | 5 |
|---|---|---|---|---|---|---|
| 7 | | 0 | 0 | 50 | 300 | 1000 |
| HEART | | 0 | 0 | 35 | 200 | 800 |
| BELL | | 0 | 0 | 30 | 100 | 500 |
| WATERMELON | | 0 | 0 | 20 | 50 | 300 |
| CHERRY | | 0 | 0 | 15 | 35 | 300 |
| ACE | A | 0 | 0 | 10 | 30 | 200 |
| KING | K | 0 | 0 | 10 | 20 | 200 |
| QUEEN | Q | 0 | 0 | 10 | 15 | 100 |
| JACK | J | 0 | 0 | 10 | 15 | 100 |
| TEN | 10 | 0 | 0 | 5 | 15 | 100 |
| NINE | 9 | 0 | 0 | 5 | 10 | 100 |

| SYMBOL | GRAPHICS | 1 | 2 | 3 | 4 | 5 |
|---|---|---|---|---|---|---|
| BONUS | | 0 | 0 | 0 | 0 | FG |

※BONUS IS WON WHEN LONG SYMBOL "GRAPE", "BANANA", OR "PLUM" STOPS IN EACH OF ARRAYS 1 TO 4 AND LONG SYMBOL "BONUS" STOPS IN ARRAY 5

INFORMATION PROCESSOR

CROSS-REFERENCE TO RELATED APPLICATION

This application claims the benefit of Japanese Patent Application No. 2018-160073 filed on Aug. 29, 2018, which application is incorporated herein by reference in its entirety.

FIELD OF THE INVENTION

The present invention relates to an information processor.

BACKGROUND OF THE INVENTION

Typically, in a smartphone (information processor) in which game application software is installed, a social game, etc., random determinations are performed in response to a player's operation of a touch panel of a smartphone, and a normal game advances based on random determination results. In such a game, the normal game may shift to a different special game when a result of the normal game satisfies a predetermined condition.

For example, in a slot game recited in Patent Literature 1 (U.S. Unexamined Patent Publication No. 2017-0200346). when a combination of symbols displayed as a result of random determination in a normal game is a predetermined combination, the game shifts to a high-probability mode in which a predetermined symbol is more likely to be displayed than in the normal game. Because the predetermined symbol is more likely to be displayed, the probability of acquiring a benefit (payout) based on a symbol combination including the predetermined symbol is high in the high-probability mode.

BRIEF SUMMARY OF THE INVENTION

However, when the determination of whether to shift to the high-probability mode depends on a result of random determination in the normal game as in the slot game of Patent Literature 1, the adjustment (calculation) of the probability of shifting to the high-probability mode is complicated, and is burdensome for game providers.

The present disclosure therefore provides an information processor in which the adjustment of the probability of shifting to a high-probability game different from a normal game is simplified in order to reduce the burden on a game provider regarding the adjustment of payout rates in the entire game.

In an example of the present disclosure for achieving the object above, an information processor which executes a normal game in which a benefit is awarded as a result of random determination and a high-probability game in which a predetermined benefit is more likely to be awarded than in the normal game, includes: a storage unit configured to store random determination tables which include a normal game random determination table and a high-probability game random determination table with which the probability of awarding the predetermined benefit is higher than in the normal game random determination table; a setting unit configured to set one of the random determination tables stored in the storage unit; and a controller which is programmed to execute the processes of: (a) executing first random determination of determining whether to set the high-probability game random determination table; (b) when it is determined in the first random determination in the process (a) not to set the high-probability game random determination table, causing the setting unit to set the normal game random determination table as a random determination table used in the normal game and executing second random determination based on the normal game random determination table; (c) when it is determined in the first random determination in the process (a) to set the high-probability game random determination table, causing the setting unit to set the high-probability game random determination table as a random determination table used in the high-probability game and executing third random determination based on the high-probability game random determination table; and (d) when the predetermined benefit is to be awarded as a result of the second random determination or the third random determination, awarding the predetermined benefit.

According to the arrangement above, whether to shift to the high-probability game in which the third random determination using the high-probability game random determination table is executed is determined based on a result of the independent first random determination irrespective of (not depending on) a result of the second random determination in the normal game. With this arrangement, the probability of shifting from the normal game to the high-probability game is easily adjustable. On this account, the burden on the game provider is reduced in connection with the adjustment of the payout rates in the entire game.

In an example of the present disclosure, the information processor is arranged so that the controller is configured to further execute the processes of: (e) when it is determined in the first random determination in the process (a) to set the high-probability game random determination table, determining the number of times of execution of the high-probability game in fourth random determination; and causing the high-probability game to be repeatedly executable in the third random determination in the process (c) the number of times determined in the fourth random determination.

According to the arrangement above, the number of times of execution of the high-probability game is determined based on a result of the independent fourth random determination irrespective of (not depending on) a result of the second random determination in the normal game. With this arrangement, the number of times of execution of the high-probability game after the shift from the normal game to the high-probability game is easily adjustable. On this account, the burden on the game provider is reduced in connection with the adjustment of the payout rates in the entire game.

In an example of the present disclosure, the information processor is arranged so that the predetermined benefit is right to execute a special game which is different from the normal game and the high-probability game, and the controller is configured to further execute the processes of: when the right to execute in free game is awarded in the process (d) as a result of the second random determination or the third random determination, executing the special game; (f) after execution of the special game, determining the number of times of execution of the high-probability game in the fourth random determination; and causing the high-probability game to be repeatedly executable in the third random determination in the process (c) the number of times determined in the fourth random determination.

With this arrangement, shift to the high-probability game always occurs after the special game. On this account, when the right to execute the special game is awarded as a benefit, the number of times of execution of the high-probability game after the shift from the normal game to the high-probability game is easily adjustable, and hence the burden on the game provider is reduced in connection with the adjustment of the payout rates in the entire game.

In an example of the present disclosure, the information processor further includes a display, wherein, normal game reel strips on which symbols are arranged are set in the normal game random determination table, a lengthy symbol in which two or more predetermined symbols are successively provided is arranged on each of the normal game reel strips in the normal game random determination table, symbols displayed on the display are selected in the second random determination from the symbols arranged on the normal game reel strips, and the benefit is awarded based on a combination of the symbols displayed on the display, and high-probability reel strip on which symbols are arranged are set in the high-probability game random determination table, the number of lengthy symbols on each of the high-probability reel strips is larger than on each of the normal game reel strips in the high-probability game random determination table, symbols displayed on the display are selected in the third random determination from the symbols arranged on the high-probability reel strips, and the benefit is awarded based on a combination of the symbols displayed on the display.

According to this arrangement, on each high-probability reel strip set by the high-probability game random determination table, the number of lengthy symbols in each of which two or more predetermined symbols are successively provided is larger than the number of lengthy symbols on the normal game reel strip. For this reason, the probability of the display of the predetermined symbols is high, and the probability of the display of the predetermined symbols is easily adjustable.

An example of the present disclosure may be a game program executed by a computer. In such a case, when the computer executes a normal game with which a benefit is awarded as a result of random determination and a high-probability game in which a predetermined benefit is more likely to be awarded than in the normal game, the game program executing the processes of: (a) causing a setting unit to execute first random determination of determining whether to set a high-probability game random determination table with which the probability of awarding the predetermined benefit is higher than in a normal game random determination table; (b) when it is determined in the first random determination in the process (a) not to set the high-probability game random determination table, causing the setting unit to set the normal game random determination table as a random determination table used in the normal game and executing second random determination based on the normal game random determination table; (c) when it is determined in the first random determination in the process (a) to set the high-probability game random determination table, causing the setting unit to set the high-probability game random determination table as a random determination table used in the high-probability game and executing third random determination based on the high-probability game random determination table; and (d) when the predetermined benefit is to be awarded as a result of the second random determination or the third random determination, awarding the predetermined benefit.

It is possible to provide an information processor, in which the adjustment of the probability of shifting to a high-probability game different from a normal game is simplified in order to reduce the burden on a game provider regarding the adjustment of payout rates in the entire game.

BRIEF DESCRIPTION OF THE DRAWINGS

FIG. 5 shows a symbol arrangement on normal game video reels.

FIG. 6 shows a symbol arrangement on high-probability game video reels.

FIG. 7 shows a symbol arrangement on free game video reels.

FIG. 8 illustrates a symbol combination table of the slot game.

DETAILED DESCRIPTION OF THE PREFERRED EMBODIMENT

Embodiment

An information processor of the present embodiment will be described with reference to figures.

Figure 1:
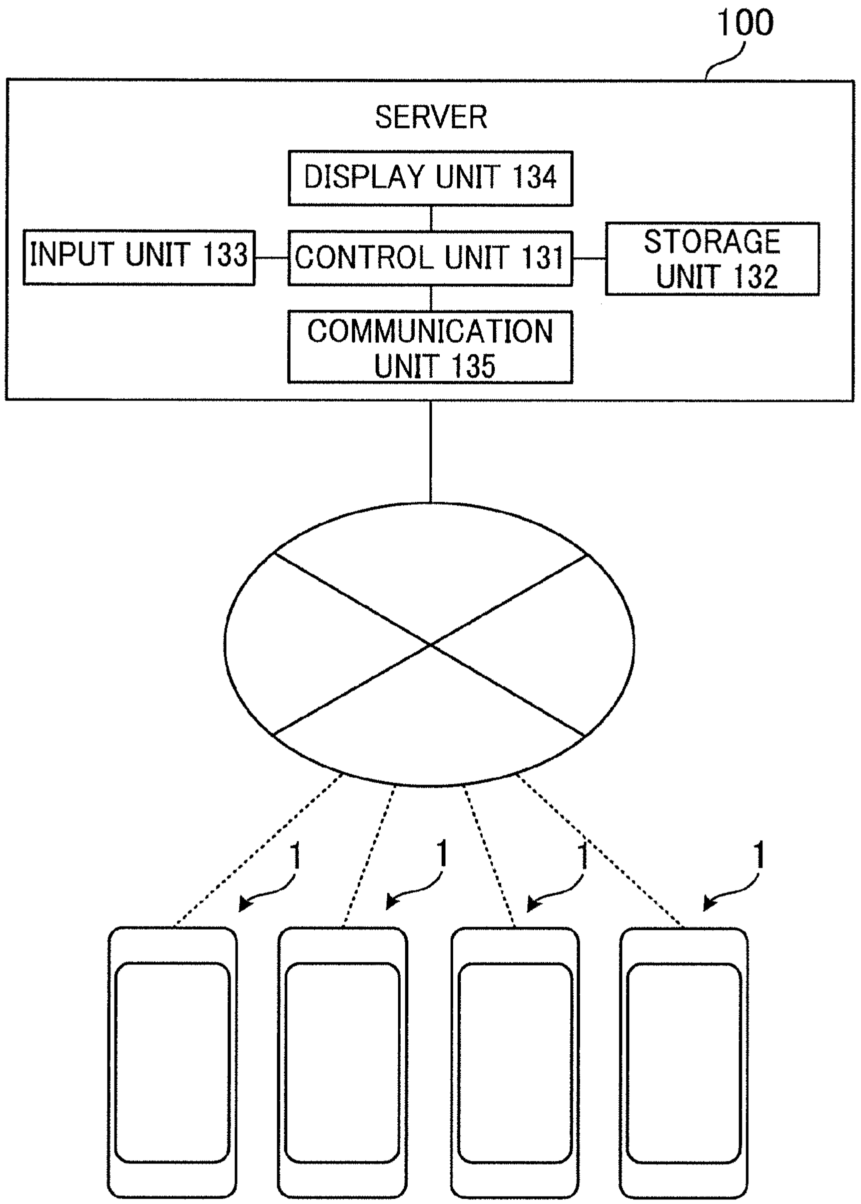
FIG. 1 illustrates a network environment between a server and a smartphone.

A slot game (unit game) which is run in the present embodiment is embodied as a social game by a server 100 (information processor) shown in FIG. 1. To be more specific, game software of the slot game is run on a web browser provided by the server 100. As a result of player's access to the web browser provided by the server 100 through an information device such as a smartphone 1 and a PC, the slot game is run.

In the present embodiment, the server 100 shown in FIG. 1 is taken as an example of the information processor. While the descriptions below deal with the server 100, processes and operations of the server 100 can be interpreted as those of a program or a game control method.

(Online)

Figure 2:
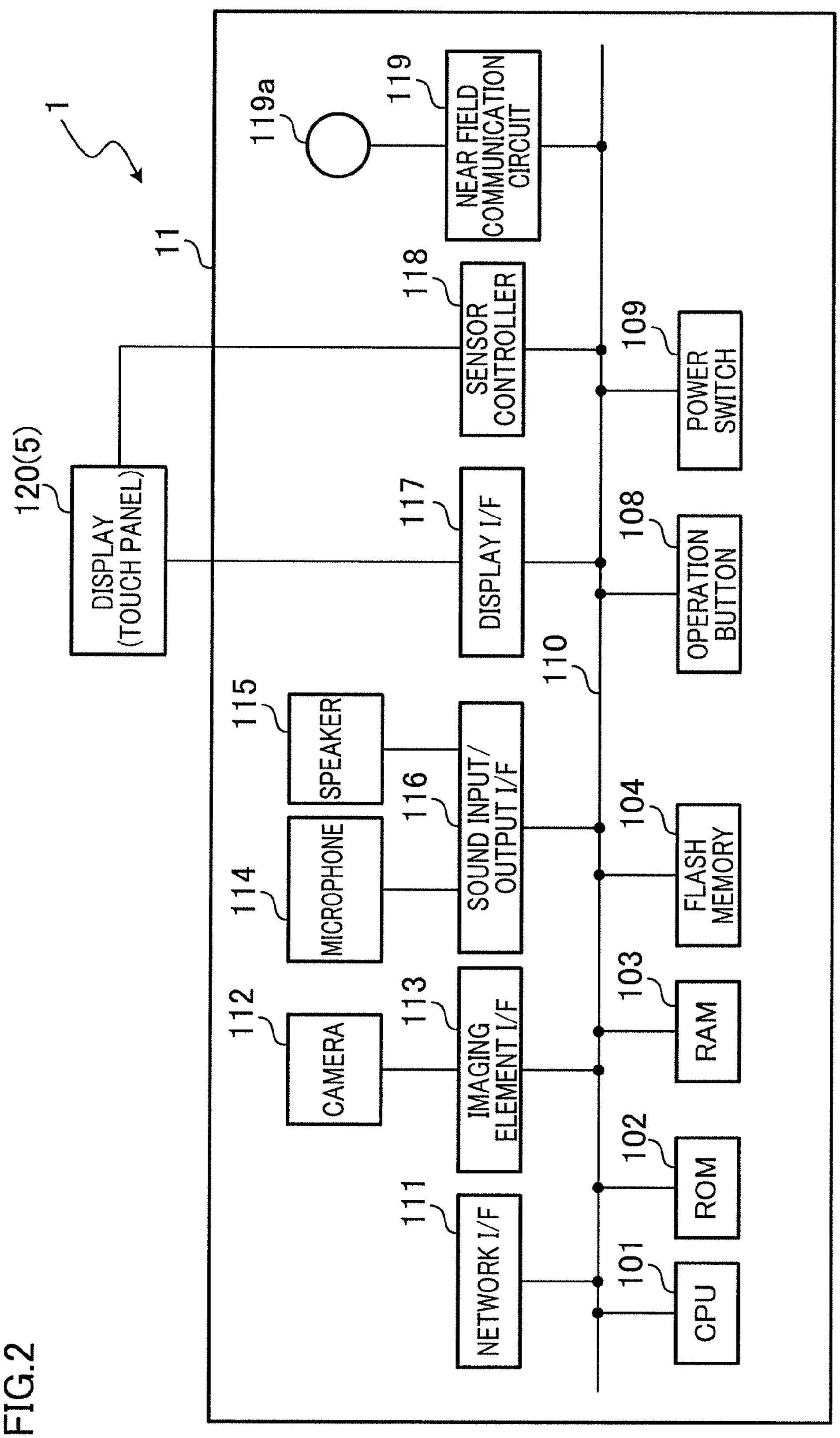
FIG. 2 is a block diagram of the electrical configuration of the smartphone.

The slot game of the present embodiment is run as an online game. To be more specific, as shown in FIG. 2, the server 100 managed by an administration organization of the slot game is connected to smartphones 1 of many players over a computer network (Internet).

In this way, the slot game is run online. As a result of player's access to the web browser provided by the server 100 through an information device such as a smartphone 1, a PC, and a gaming machine, the slot game can be run. The server 100 is configured to exchange credits (which can be bought by cash, a credit card, electronic money, a prepaid card, etc.) owned by players to coins (gaming media) which are electronic information usable in the slot game, and to manage the coins owned by the players.

(Structure of Server 100)

As shown in FIG. 1, the server 100 is an information processor which is used by an administrator of the slot game, etc. to manage and control a social game service. As the server 100 receives a request from an information device such as a smartphone 1 operated by a player, the server 100 sends a game program, a web browser, etc. which can be run on the smartphone 1. The server 100 of the present embodiment includes a control unit 131, a storage unit 132, an input unit 133, a display unit 134, and a communication unit 135.

The control unit 131 (e.g., a CPU) is configured to control the server 100. Furthermore, data is sent and received between the control unit 131, the storage unit 132, the input unit 133, the display unit 134, and the communication unit 135.

The storage unit 132 is constituted by a ROM (Read Only Memory) storing a system program, a RAM (Random Access Memory) which is a rewritable storage area, a flash memory, etc.

The input unit 133 is a device allowing the administrator or the like to input setting or the like of the slot game, and is embodied by a keyboard and a mouse, for example.

The display unit 134 is configured to display an operation screen for the administrator, in response to an instruction from the control unit 131.

The communication unit 135 is provided to communicate with the smartphones 1.

(Structure of Smartphone 1)

As shown in FIG. 2, the smartphone 1 includes, in a housing 11, a CPU 101 (controller), a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119*a* of the near field communication circuit 119. In the front surface of the housing 11, a display 120 with a touch panel 5 (input unit) is embedded.

The display 120 is configured to be able to display images. The display method of the display 120 is, for example, liquid crystal, organic electroluminescence, CRT (Cathode Ray Tube), and plasma.

The CPU (Central Processing Unit) 101 controls the entire smartphone 1. The ROM (Read Only Memory) 102 stores programs used for driving the CPU 101, such as an IPL (Initial Program Loader).

The RAM (Random Access Memory) 103 is used as a work area of the CPU 101. The flash memory 104 stores application software (program) for running the game of the present embodiment, a communication program, and data such as image data and sound data. The operation button 108 is used for, for example, initial setting of the smartphone 1. The power switch 109 is used for turning on/off the power source of the smartphone 1.

The network I/F (Interface) 111 is an interface for performing data communication with the server 100, etc., by utilizing a communication network such as the Internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 120 under the control of the CPU 101. The sensor controller 118 is a circuit for receiving an input from the touch panel 5 of the display 120. The near field communication circuit 119 is a communication circuit based on NFC (Near Field Communication) (Registered Trademark). Bluetooth (Registered Trademark), or the like. The bus line 110 is an address bus, a data bus, or the like for electrically connecting the components such as the CPU 101.

(Outline of Slot Game Executed by Server 100)

Figure 3:
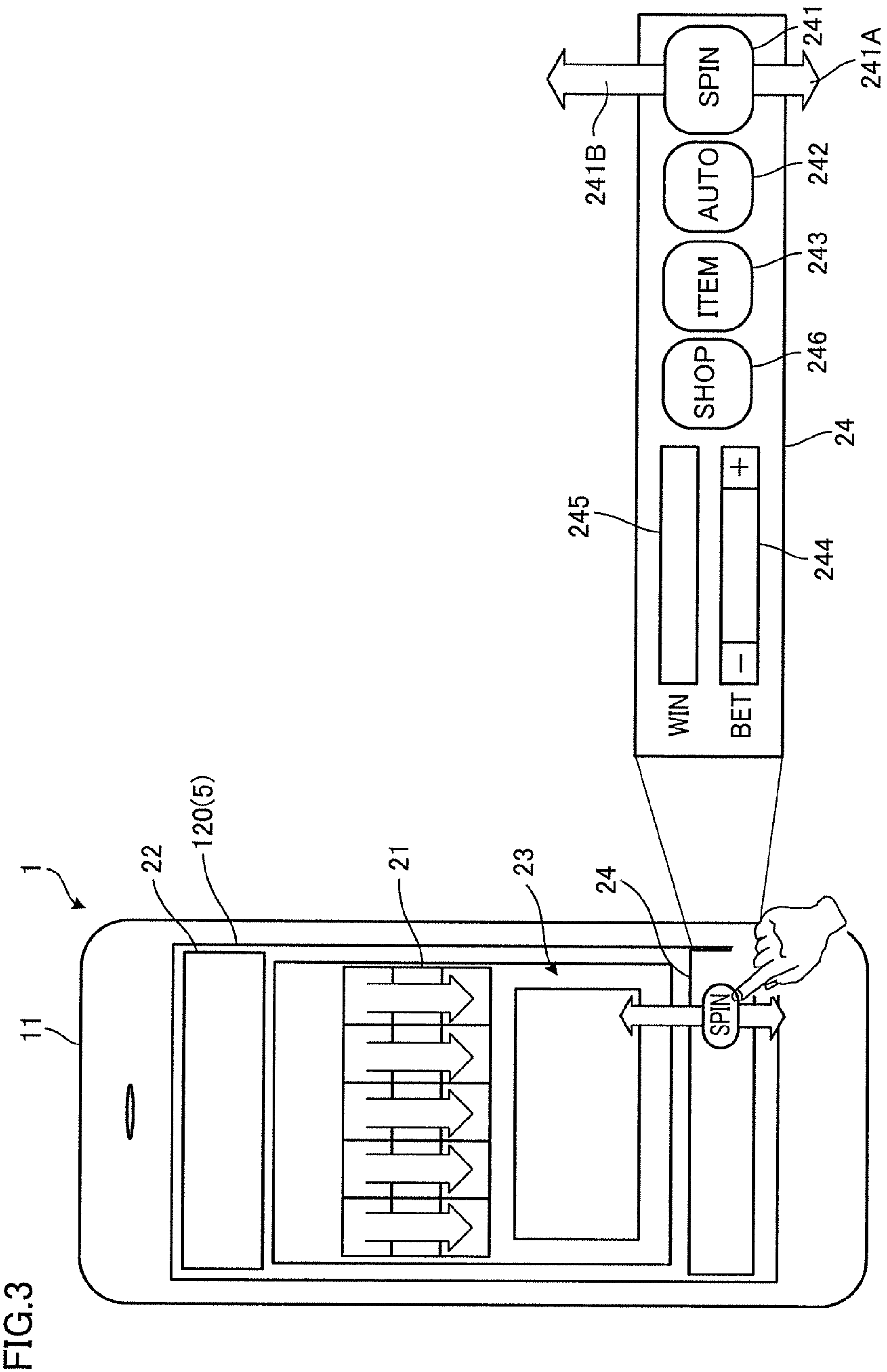
FIG. 3 shows a display state of a slot game on the smartphone.

When a request is sent from the smartphone 1 to the server 100, effect images, videos, etc. of the slot game are displayed by a web browser on the display 120 of the smartphone 1. Thereafter, the slot game starts upon selection of a selection image indicating the start of the slot game on the touch panel 5 (detailed later). For example, as shown in FIG. 3, when the slot game starts, the slot game in which symbols are rearranged in a symbol display area 21 which is formed of 20 areas forming a matrix with 5 columns and 4 rows becomes executable.

Plural types of slot games may be executable, and the rule, the state of payout, and effect images may be different depending on which slot game is executed. For example, in a slot game of one type, symbols are rearranged in a symbol display area formed of 9 areas forming a matrix with 3 columns and 3 rows. In this slot game, whether a win is achieved is determined based on a combination of symbols rearranged on a payline set only at the middle stage of the symbol display area (winning determination).

The slot game of the present embodiment is basically started in response to the consumption of a predetermined amount of coins (gaming media) owned by a player. When a predetermined condition is satisfied, the player is able to start the slot game without the consumption of coins. (The predetermined condition is, for example, a condition of awarding a free game or the slot game is playable without the consumption of coins for a predetermined number of times in a day.)

The coins (gaming media) owned by players are electronic information. A player accesses the server 100 via the smartphone 1 and exchanges credits to coins in accordance with a payment method specified by the management organization of the slot game. The coins owned by players are used in various ways. For example, the coins are consumed to obtain an effect influencing on the slot game (as purchase of items), or consumed to change the appearance of an avatar of a player.

The number of coins owned by each player, which is managed by the server 100, is shared between the server 100 and each smartphone 1.

The gaming medium is not limited to any particular type, and may be electronic money or a game point not including valuable information.

(Slot Game: Definitions)

The slot game executed in the present embodiment is, as shown in FIG. 3, a game in which symbols are varied in the symbol display area 21 (scrolling image of reels) and then stopped (rearranged), and a benefit (e.g., a payout, right to execute the free game, or an item advantageous or disadvantageous for the player) is awarded based on the combination of the symbols displayed in the symbol display area 21. A state in which symbols are displayed after being varied and stopped in the symbol display area 21 is termed "rearrangement".

A payout awarded based on a combination of symbols displayed in the symbol display area 21 is awarding of coins.

The "unit game" is a series of operations from the start of the receiving of a bet to the establishment of a prize (i.e., a combination of symbols satisfies a predetermined relation). To put it differently, the unit game includes a single bet time for receiving a bet, a single game time of rearranging stopped symbols, and a single payout time of a payout process of awarding a payout.

(Slot Game Screen)

A slot game screen displayed on the display 120 of the smartphone 1 will be described.

As shown in FIG. 3, when the slot game is executed, the slot game screen is displayed on the display 120. The slot game screen displays the symbol display area 21 formed of 20 areas forming a matrix with 5 columns and 4 rows, a game information display area 22 on which information of increment and decrement in accordance with the execution of the slot game (e.g., the number of currently-owned coins) is displayed, an effect display area 23 on which moving and still images and messages related to the game are displayed in accordance with the progress of the slot game, and an operation display area 24 which is operated by the player to progress the slot game. The operation display area 24 includes a spin button 241, an AUTO button 242, an ITEM button 243, a bet button 244, a WIN display portion 245, and a shop button 246.

On the entire surface of the display 120, a touch panel 5 which allows the slot game screen to be viewable from the outside is provided. The touch panel 5 makes it possible to detect the coordinates of a part touched by a player's finger or the like. With this arrangement, for example, the slot game (unit game) is executed once, upon a touch input of the image of the spin button 241. Furthermore, the slot game is serially executed plural times as the image of the AUTO button 242 is pressed. When the image of the ITEM button 243 is pressed, the player is able to select and use a previously-obtained item (which exerts an influence in the slot game). When the image of the shop button 246 is touched, the smartphone 1 accesses the server 100 and the player enters a shop in which credits (which can be bought by cash, a credit card, electronic money, a prepaid card, etc. owned by the player) are exchangeable with coins, or credits or coins are exchangeable with an item.

In the present embodiment, under the control of the game program, a spin button 241 (game element) in the operation display area 24 of the display 120 (display device) is movable in the operation display area 24 in response to an input to the touch panel 5. Furthermore, in response to an input to the touch panel 5, a route display 241A of the spin button 241 is displayed to elongate (or shorten) the movement direction 241B, and when the input to the touch panel 5 is finished (i.e., the finger is removed from the touch panel 5), the spin button 241 is moved in the movement direction 241B.

(Paylines)

In the symbol display area 21, five video reels on which symbols are provided (see FIG. 5 to FIG. 7) are scrolled, and are stopped after a predetermined time elapses. As a result, parts of each video reel (four symbols in the present embodiment) are displayed for the player. In the symbol display area 21, one symbol is displayed in each of the areas in the upper stage, the upper middle stage, the lower middle stage, and the lower stage, in each video reel. To put it differently, 20 symbols forming a matrix with 5 columns and 4 rows are displayed in the symbol display area 21.

Figure 4:
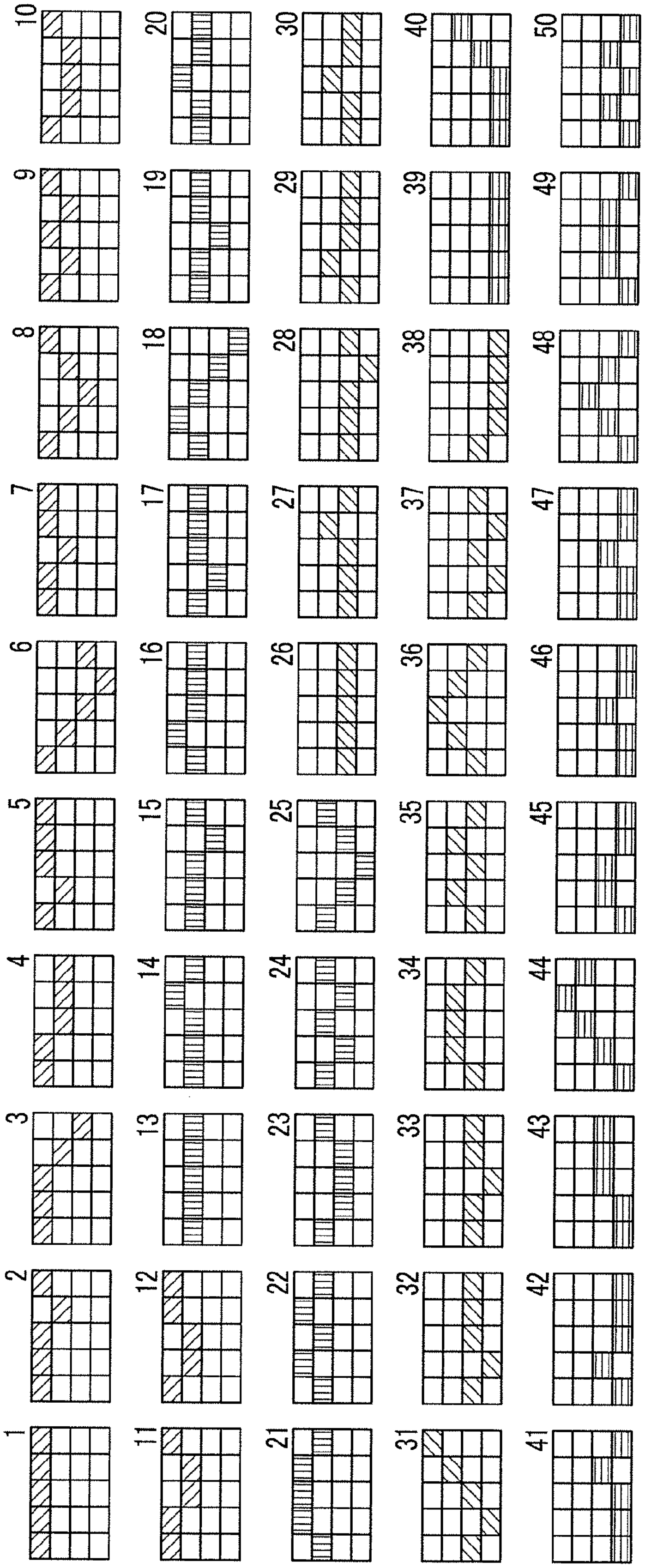
FIG. 4 shows paylines of the slot game.

In the present embodiment, one of four stages, i.e., the upper stage, the upper middle stage, the lower middle stage, and the lower stage, is selected in each of the video reels, and a line connecting the selected stages is used as a payline (see FIG. 4). When three or more symbols of the same type successively stop on the payline, a win is achieved (a payout is awarded) (see FIG. 8). In regard to the number of the paylines, while there are 50 paylines in the present embodiment as shown in FIG. 4, the number of the paylines may be 30, for example.

(Symbol Arrays of Video Reels)

With reference to FIG. 5 to FIG. 7, symbol arrays of normal game video reels (equivalent to a normal game random determination table), symbol arrays of high-probability game video reels (equivalent to a high-probability game random determination table), and symbol arrays of free game video reels will be described.

(Normal Game Video Reels)

As shown in FIG. 5, to each of normal game video reels "REEL1", "REEL2", "REEL3", "REEL4", and "REEL5" (equivalent to normal game reel strips), a symbol array formed of symbols corresponding to code numbers 0 to 30 is allocated. The types of the symbols in each symbol array include normal symbols "7", "HEART", "BELL", "WATERMELON" "CHERRY", "ACE", "KING (K)", "QUEEN (Q)", "JACK (J)", "10", and "9", long symbols (equivalent to lengthy symbols) which constitute winning of BONUS by which awarding of a free game is triggered, such as "GRAPE", "BANANA", "PLUM", and "BONUS", and a "WILD" long symbol which substitutes for normal symbols. A normal symbol is a symbol which is sized to be displayed (rearranged) in one stage of the symbol display area 21 (see FIG. 12). Meanwhile, each of the long symbols such as "GRAPE", "BANANA", "PLUM", and "BONUS" and the "WILD" long symbol is a symbol which is sized to occupy four stages of one array of the symbol display area 21, i.e., the upper stage, the upper middle stage, the lower middle stage, and the lower stage (see FIG. 13). The long symbol is equivalent to a lengthy symbol in which four symbols which are "GRAPE", "BANANA", "PLUM", or "BONUS" are successively provided. The BONUS is won when a long symbol "GRAPE", "BANANA", or "PLUM" stops in each of the arrays 1 to 4 of the symbol display area 21 and a long symbol "BONUS" stops in the array 5.

(High-Probability Game Video Reels)

As shown in FIG. 6, to each of high-probability game video reels "REEL1", "REEL2", "REEL3", "REEL4", and "REEL5" (equivalent to high-probability reel strips), a symbol array formed of symbols corresponding to code numbers 0 to 30 is allocated. The types of the symbols arranged in each symbol array are identical with those in the normal game video reels. However, the number of long symbols such as "GRAPE", "BANANA", "PLUM", and "BONUS" is larger than the number of long symbols in the normal game video reels. On this account, when the high-probability game video reels are used, the probability of winning the BONUS is high as compared to cases where the normal game video reels are used.

As described above, on the high-probability game video reels "REEL1", "REEL2", "REEL3", "REEL4", and "REEL5", the number of long symbols in each of which two or more predetermined symbols such as "GRAPE", "BANANA", "PLUM", and "BONUS" are successively provided is larger than the number of long symbols on the normal game video reels. For this reason, the probability of the display of the predetermined symbols such as "GRAPE", "BANANA", "PLUM", and "BONUS" is high, and the probability of the display of the predetermined symbols such as "GRAPE", "BANANA", "PLUM", and "BONUS" is easily adjustable.

(Free Game Video Reels)

As shown in FIG. 7, to each of the free game video reels "REEL1", "REEL2", "REEL3", "REEL4", and "REEL5", a symbol array formed of symbols corresponding to code numbers 0 to 16 is allocated. While the number of symbols provided on each symbol array is identical with the number on the normal game video reels, the code numbers are smaller than those in the normal game video reels. On this account, when the free game video reels are used, the probability of winning the BONUS is high as compared to cases where the normal game video reels are used.

(Symbol Combination Table)

Now, a symbol combination table will be described with reference to FIG. 8. FIG. 8 shows a symbol combination table used in the slot game of the present embodiment.

The symbol combination table of the slot game defines the combinations of symbols (the number of symbols) with which a win is achieved and payout amounts of coins paid out (payout). In the slot game, scroll of five video reels is stopped, and a win is achieved when three or more symbols of the same type successively stop on a payline which is a target of result determination, in the symbol display area 21. In accordance with the type of win, a benefit will be given to the player in the form of awarding a payout and the like.

When the BONUS is won (i.e., when a long symbol “GRAPE”, “BANANA”, or “PLUM” stops in each of the arrays 1 to 4 of the symbol display area 21 and a long symbol “BONUS” stops in the array 5), the right to execute the free game is awarded. When the right to execute the free game is awarded, a free game benefit accompanied with the right to execute the free game is awarded in accordance with the type and number of long symbols displayed on the array 1 to array 4 of the symbol display area 21. To be more specific, in accordance with the number of displayed long symbols “BANANA”, a payout calculated by multiplying the number of betted coins by a multiplying factor (which is 1 when the number of coins is 0, 1 when the number of coins is 1, 2 when the number of coins is two, 5 when the number of coins is three, and 10 when the number of coins is four) is awarded. Furthermore, in accordance with the number of displayed long symbols “GRAPE”, the number of times of execution of the free game is determined (5 times when the number of long symbols is 0, 5 times when the number of long symbols is one, 8 times when the number of long symbols is two, 12 times when the number of long symbols is three, and 20 times when the number of long symbols is four). Furthermore, in accordance with the number of displayed long symbols “PLUM”, a payout rate in the free game is determined (1 when the number of long symbols is 0, 1 when the number of long symbols is one, 2 when the number of long symbols is two, 5 when the number of long symbols is three, and 10 when the number of long symbols is four).

Figure 10:
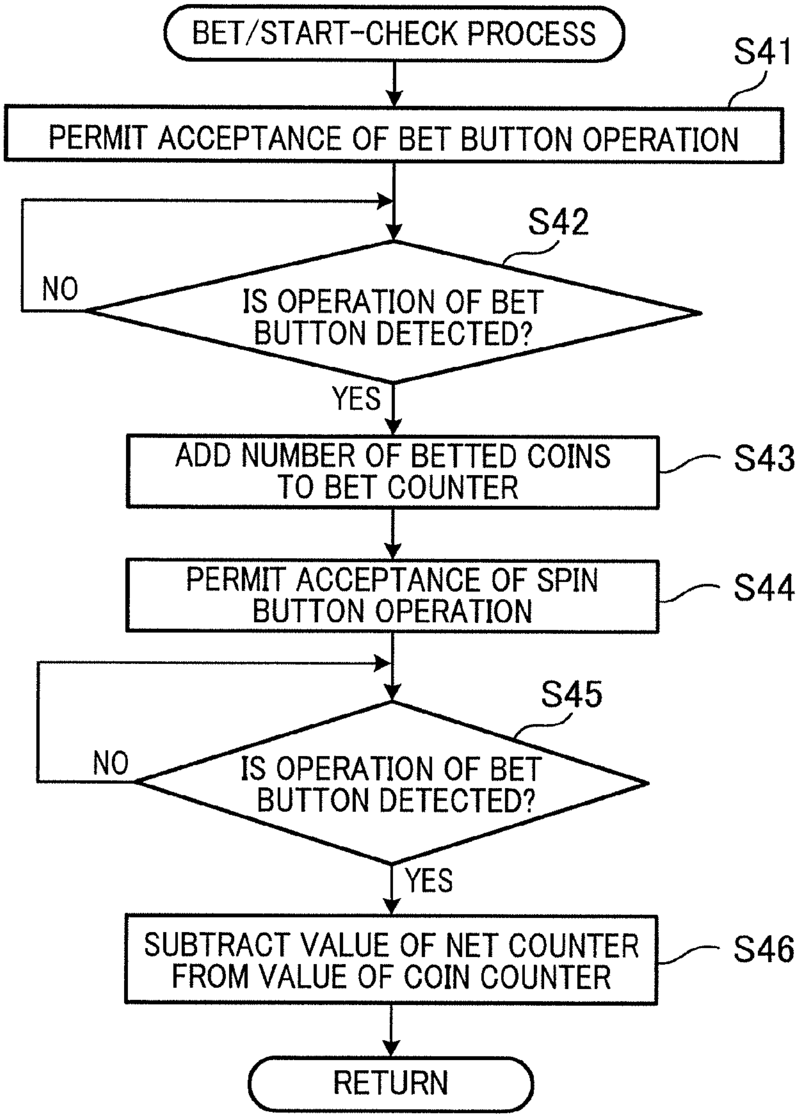
FIG. 10 shows a flowchart of a bet/start-check process.
Figure 11:
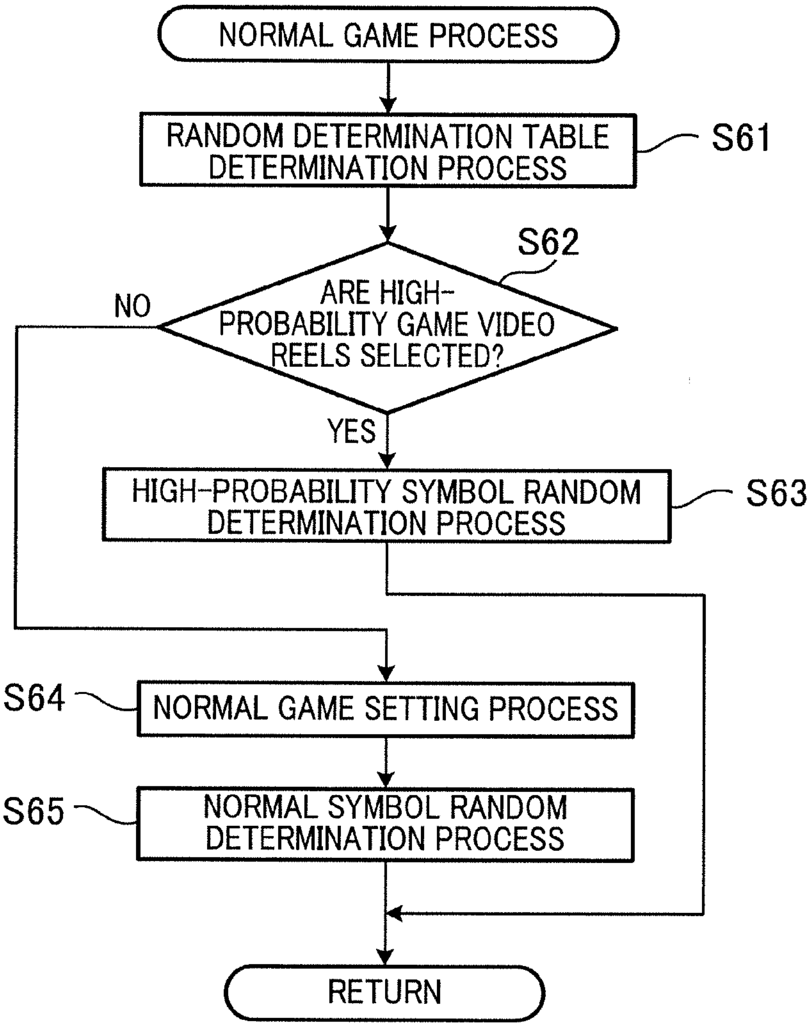
FIG. 11 is a flowchart of a normal game process.

[Contents of Program] Now, the program of the slot game executed by the server 100 will be described with reference to FIG. 9 to FIG. 11.

(Slot Game Control Process)

Figure 9:
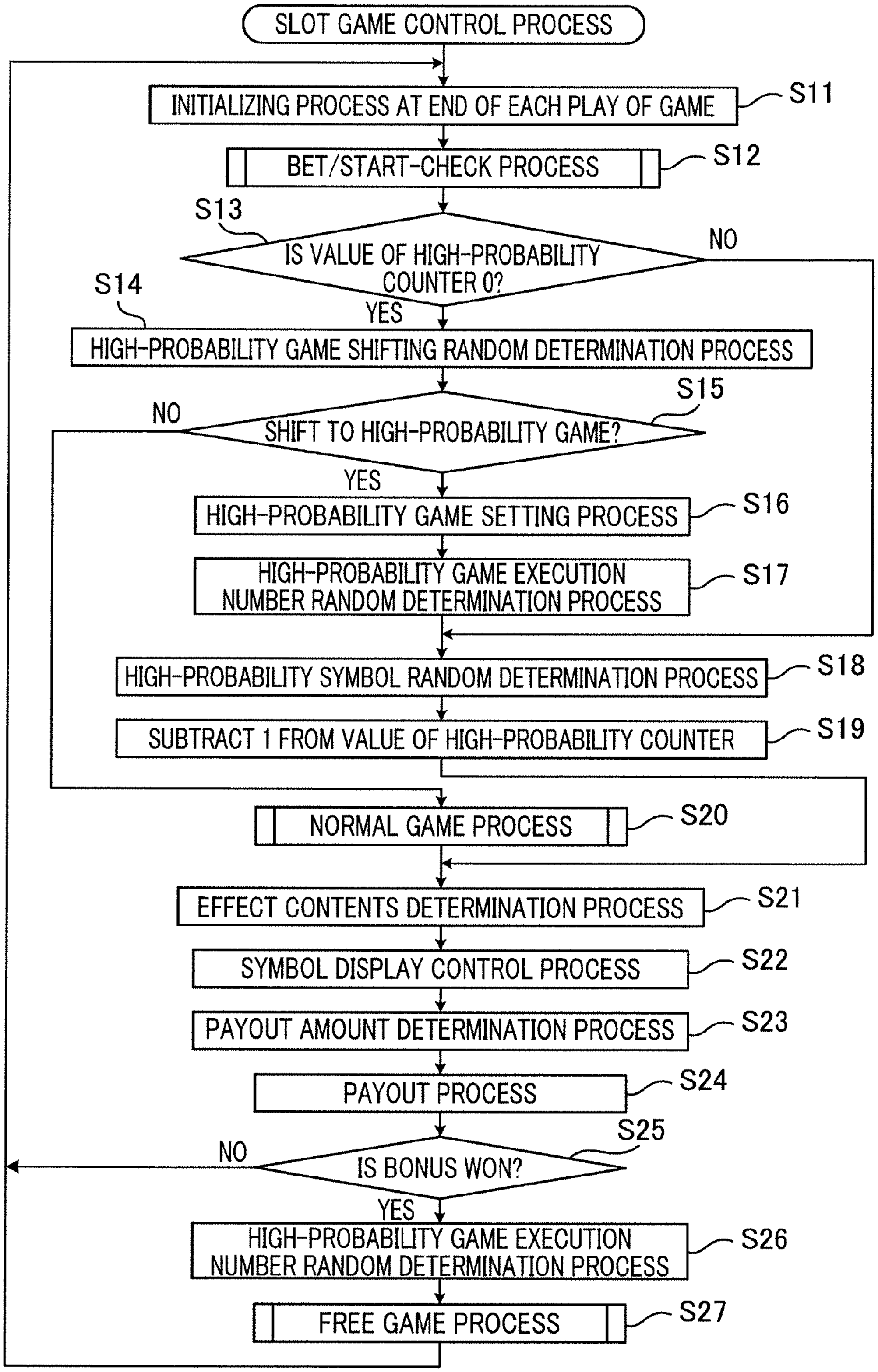
FIG. 9 shows a flowchart of a slot game control process.

Referring to FIG. 9, a slot game control process will be described. In the descriptions below, processes are executed as a result of sending and receiving of requests and information between the smartphone 1 operated by the player and the server 100, and results of the processes are displayed on the display 120 of the smartphone 1.

To begin with, the control unit 131 executes an initializing process at the end of each play of the game, in order to start the slot game (S11). For example, this process clears data in a working area of the storage unit 132, which becomes unnecessary at the end of each play of the unit game, e.g., a payline activated in the previous execution of the unit game, the value of a bet counter in a bet amount storage area, and symbols to be displayed on the symbol display area 21 as a result of random determination.

The control unit 131 then executes a later-described bet/start-check process (S12). In this process, for example, an input such as pressing of a “+” button and a “−” button (see FIG. 3) of the bet button 244 of the operation display area 24 of the display 120 of the smartphone 1 through the touch panel 5 is checked. As a result of this, the value of the bet counter of the storage unit 132 is determined. In other words, the number of coins betted on the unit game by the player is determined. While in the present embodiment all of 50 paylines shown in FIG. 4 are active, the number of active paylines may be determined in accordance with the number of betted coins.

Subsequently, the control unit 131 determines whether the value of a high-probability counter of the storage unit 132 is 0 (S13).

When the value of the high-probability counter is 0 (YES in S13), the control unit 131 executes a high-probability game shifting random determination process (equivalent to a first random determination) (S14). In this high-probability game shifting random determination process, whether to shift from the normal game to the high-probability game is randomly determined. To be more specific, the normal game is shifted to the high-probability game at the probability of 1/200. The normal game is a slot game in which 20 symbols to be displayed in the symbol display area 21 are selected by random determination using the normal game video reels shown in FIG. 5 or the high-probability game video reels shown in FIG. 6. The high-probability game is a slot game in which 20 symbols to be displayed in the symbol display area 21 are selected by random determination using only the high-probability game video reels shown in FIG. 6. When the high-probability game video reels are used, the probability of achieving the winning of the BONUS is high as compared to cases where the normal game video reels are used. The high-probability game is therefore more advantageous for the player than the normal game.

Subsequently, the control unit 131 determines whether to shift to the high-probability game as a result of the high-probability game shifting random determination process in S14 (S15). When it is determined that the game shifts to the high-probability game (YES in S15), the control unit 131 (equivalent to a setting unit) executes a high-probability game setting process (S16). In this high-probability game setting process, symbol arrays of the high-probability game video reels shown in FIG. 6 are set as a random determination table used in a later-described high-probability symbol random determination process (see S18).

Subsequently, the control unit 131 executes a high-probability game execution number random determination process (equivalent to a fourth random determination) (S17). In this high-probability game execution number random determination process, how many times the high-probability game can be executed is determined. In other words, how many times the unit game can be executed based on the high-probability symbol random determination process using the high-probability game video reels is determined. To be more specific, one number is randomly selected from a range of 20 to 49. The number of times of execution of the high-probability game is determined as: “20 to 29” at the probability of 60/100 (60%); “30 to 39” at the probability of 25/100 (25%); or “40 to 49” at the probability of 15/100 (15%). Then the value of the high-probability counter of the storage unit 132 is updated to (overwritten by) the number of times of execution of the high-probability game determined in the high-probability game execution number random determination process in S17. Alternatively, the number of times of execution of the high-probability game determined in the high-probability game execution number random determination process in S17 may be added to the value of the high-probability counter of the storage unit 132.

As described above, the number of times of execution of the high-probability game is determined based on a result of the independent high-probability game execution number random determination process (fourth random determination), irrespective of (not depending on) a result of the normal symbol random determination process (second random determination) in the normal game. With this arrangement, the number of times of execution of the high-probability game after the shift from the normal game to the high-probability game is easily adjustable. On this account, the burden on the game provider is reduced in connection with the adjustment of the payout rates in the entire game.

After S17 or when the value of the high-probability counter is not 0 in S13 (NO in S13), the control unit 131 executes a high-probability symbol random determination process (equivalent to a third random determination) (S18). In this high-probability symbol random determination process, by using the high-probability game video reels shown in FIG. 6 which are currently set, to-be-stopped symbols are randomly selected from symbols provided on the video reels (REEL1, REEL2, REEL3, REEL4, and REEL5). The to-be-stopped symbols are data of five symbols to be displayed in the upper stage of each column of the symbol display area 21, out of the symbols forming each video reel. In this way, 20 symbols displayed in the symbol display area 21 are determined.

For example, in case of REEL1 of the video reels, when a code number "15" is randomly selected from 31 symbols (code numbers "0" to "30"), the "BANANA" long symbol corresponding to the code number "15" is selected as the to-be-stopped symbol. In case of the REEL2, when a code number "30" is randomly selected from 31 symbols (code numbers "0" to "30"), the "GRAPE" long symbol corresponding to the code number "30" is selected as the to-be-stopped symbol. In case of the REEL3, when a code number "26" is randomly selected from 31 symbols (code numbers "0" to "30"), the "PLUM" long symbol corresponding to the code number "26" is selected as the to-be-stopped symbol. In case of the REEL4, when a code number "14" is randomly selected from 31 symbols (code numbers "0" to "30"), the "GRAPE" long symbol corresponding to the code number "14" is selected as the to-be-stopped symbol. In case of the REEL5, when a code number "26" is randomly selected from 31 symbols (code numbers "0" to "30"), the "BONUS" symbol corresponding to the code number "26" is selected as the to-be-stopped symbol.

The control unit 131 stores the determined five to-be-stopped symbols in a symbol storing area in the storage unit 132.

Subsequently, the control unit 131 subtracts 1 from the value of the high-probability counter of the storage unit 132 (S19).

When it is determined not to shift to the high-probability game in S15 (NO in S15), the control unit 131 executes the normal game process (S20). In the normal game process in S20, as shown in the flow chart of FIG. 11, the control unit 131 executes a random determination table determination process, to begin with (S61). In this random determination table determination process, which set of random determination tables, i.e., the normal game video reels shown in FIG. 5 and the high-probability game video reels shown in FIG. 6, is used in the normal game is randomly determined. To be more specific, the normal game video reels shown in FIG. 5 are selected at the probability of ⅔ (66.66%), whereas the high-probability game video reels shown in FIG. 6 are selected at the probability of ⅓ (33.33%).

Subsequently, the control unit 131 determines whether the high-probability game video reels are selected in the random determination table determination process in S61 (S62). When the high-probability game video reels are selected (YES in S62), the control unit 131 executes the high-probability symbol random determination process in the same manner as in S18 (S63). In the high-probability symbol random determination process in S63, five to-be-stopped symbols are selected and 20 symbols to be displayed in the symbol display area 21 are determined.

The control unit 131 then stores the determined five to-be-stopped symbols in a symbol storing area in the storage unit 132.

When it is determined not to shift to the high-probability game in S62 (NO in S62), the control unit 131 (equivalent to the setting unit) executes a normal game setting process (S64). In this normal game setting process, symbol arrays of the normal game video reels shown in FIG. 5 are set as a random determination table used in a later-described normal symbol random determination process (see S65).

Subsequently, the control unit 131 executes the normal symbol random determination process (equivalent to the second random determination) (S65). In this normal symbol random determination process, by using the normal game video reels shown in FIG. 5 which are currently set, to-be-stopped symbols are randomly selected from symbols provided on the video reels (REEL1, REEL2, REEL3, REEL4, and REEL5). The to-be-stopped symbols are data of five symbols to be displayed in the upper stage of each column of the symbol display area 21, out of the symbols forming each video reel. In this way, 20 symbols displayed in the symbol display area 21 are determined.

For example, in case of REEL1 of the video reels, when a code number "21" is randomly selected from 30 symbols (code numbers "0" to "29"), the "9" symbol corresponding to the code number "21" is selected as the to-be-stopped symbol. In case of the REEL2, when a code number "9" is randomly selected from 31 symbols (code numbers "0" to "30"), the "WATERMELON" symbol corresponding to the code number "9" is selected as the to-be-stopped symbol. In case of the REEL3, when a code number "7" is randomly selected from 31 symbols (code numbers "0" to "30"), the "10" symbol corresponding to the code number "7" is selected as the to-be-stopped symbol. In case of the REEL4, when a code number "6" is randomly selected from 31 symbols (code numbers "0" to "30"), the "KING" symbol corresponding to the code number "6" is selected as the to-be-stopped symbol. In case of the REEL5, when a code number "5" is randomly selected from 30 symbols (code numbers "0" to "29"), the "WATERMELON" symbol corresponding to the code number "5" is selected as the to-be-stopped symbol.

The control unit 131 stores the determined five to-be-stopped symbols in a symbol storing area in the storage unit 132.

After S63 or S65, the normal game process of S20 is terminated.

After S19 or S20, the control unit 131 executes an effect contents determination process (S21). The control unit 131 samples an effect-use random number and randomly selects any of a plurality of predetermined effect contents. Furthermore, in the effect contents determination process, if the shift to the high-probability game has been done, an indication effect is randomly executed to indicate that the high-probability game is being played. To be more specific, when the indication effect is executed at the probability of 1/16, as shown in FIG. 14, the flow of a cloud 201 (from left to right) which is shown as a background image at a location above the symbol display area 21 on the display 120 is slower than the flow in the normal game (i.e., flow of a cloud 201 in FIG. 13).

Figure 13:
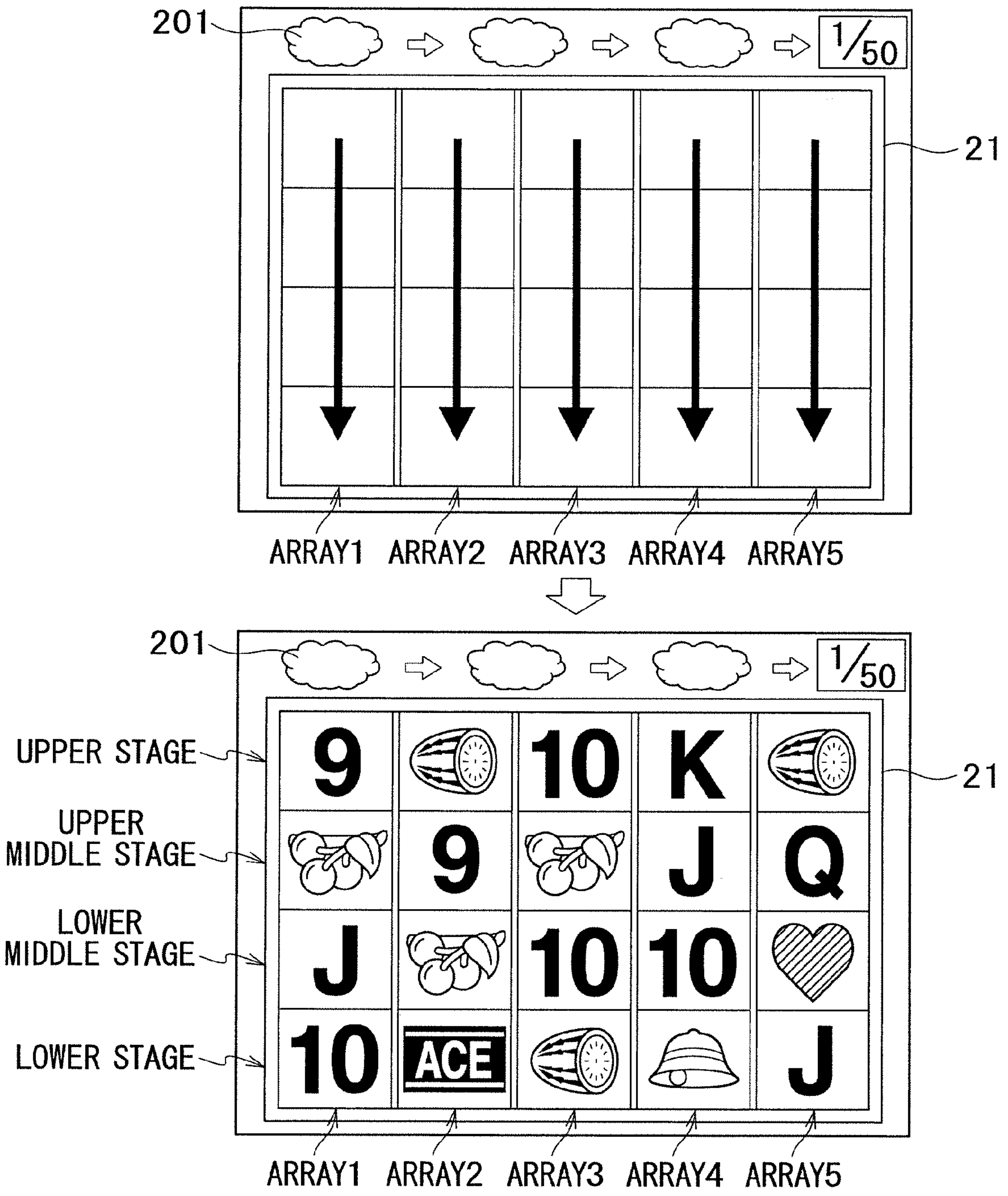
FIG. 13 illustrates a normal game displayed on a display.

Then, the control unit 131 executes a symbol display control process (S22). In this symbol display control process, as shown in FIG. 13 or FIG. 14, after the five video reels scroll in the symbol display area 21 of the smartphone 1 and then a predetermined time elapses, the five to-be-stopped symbols selected in the high-probability symbol random determination process in S18 or in the normal symbol random determination process in S65 stop in order in the upper stages of the respective columns of the symbol display area 21. That is, 20 symbols including the to-be-stopped symbols are displayed in the symbol display area 21.

For example, in the normal symbol random determination process in S65, when the "9" symbol is selected as a to-be-stopped symbol in the REEL1, the "WATERMELON" symbol is selected as a to-be-stopped symbol in the REEL2, the "10" symbol is selected as a to-be-stopped symbol in the REEL3, the "KING" symbol is selected as a to-be-stopped symbol in the REEL4, and the "WATERMELON" symbol is selected as a to-be-stopped symbol in the REEL5, the symbols are provided in the upper stages of the respective columns of the symbol display area 21, as shown in FIG. 13. In each column of the symbol display area 21, symbols having code numbers each of which is one number behind the to-be-stopped symbols are rearranged (see FIG. 13).

Figure 14:
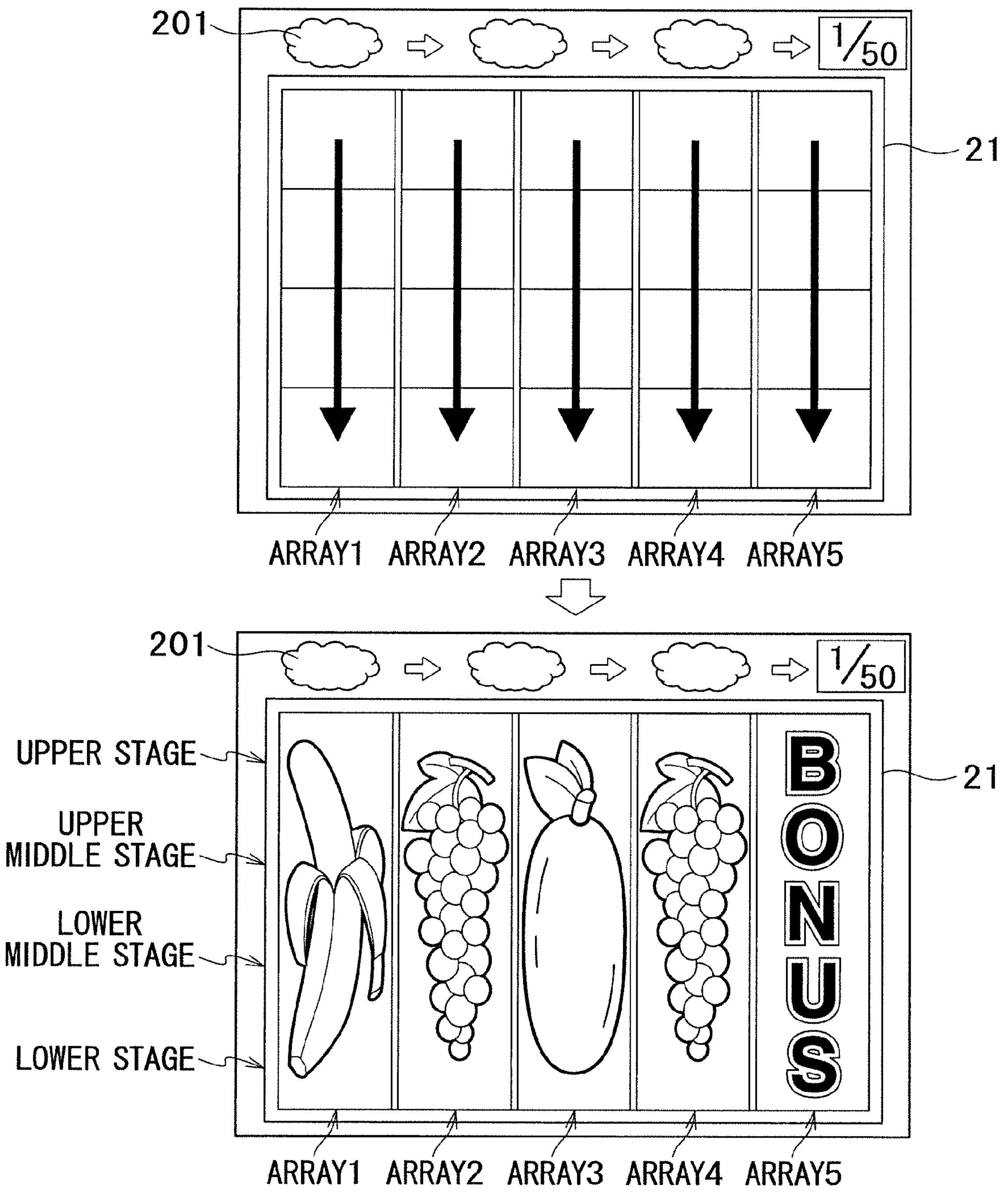
FIG. 14 illustrates a high-probability game displayed on the display.

In the high-probability symbol random determination process in S18, when the "BANANA" long symbol is selected as a to-be-stopped symbol in the REEL1, the "GRAPE" long symbol is selected as a to-be-stopped symbol in the REEL2, the "PLUM" long symbol is selected as a to-be-stopped symbol in the REEL3, the "GRAPE" long symbol is selected as a to-be-stopped symbol in the REEL4, and the "BONUS" long symbol is selected as a to-be-stopped symbol in the REEL5, the symbols are provided in the upper stages of the respective columns of the symbol display area 21, as shown in FIG. 14. When a to-be-stopped symbol is a long symbol, as shown in FIG. 14, the long symbol is displayed in the four stages, i.e., the upper stage, the upper middle stage, the lower middle stage, and the lower stage (see FIG. 14).

Subsequently, the control unit 131 executes a payout amount determination process (S23). In this process, whether three or more symbols of the same type successively stop on a payline (see FIG. 4) of the symbol display area 21 and a win is achieved is determined based on the symbol combination table for the slot game (see FIG. 8), which is stored in the storage unit 132. In accordance with the type of win, a benefit will be given in the form of awarding a payout and the like. The payout awarded is stored in a payout amount storage area of the storage unit 132.

Then the control unit 131 executes a payout process (S24). The control unit 131 adds a value stored in the payout amount storage area of the storage unit 132 to a value of the coin counter provided in the storage unit 132. For example, when "200" is stored in the payout amount storage area in the payout amount determination process in S23, "200" is added to the value of the coin counter.

Subsequently, the control unit 131 determines whether the winning of the BONUS is established (i.e., the long symbol "GRAPE", "BANANA", or "PLUM" stops in each of the arrays 1 to 4 of the symbol display area 21 and a long symbol "BONUS" stops in the array 5) (S25). When the "BONUS" win is achieved (YES in S25), the control unit 131 executes a high-probability game execution number random determination process (S26). In this high-probability game execution number random determination process, how many times the high-probability game can be executed is randomly determined as in S17. As a result, in the present embodiment, the value of the high-probability counter of the storage unit 132 is updated to (overwritten by) the number of times of execution of the high-probability game determined in the high-probability game execution number random determination process in S26.

Alternatively, the number of times of execution of the high-probability game determined in the high-probability game execution number random determination process in S26 may be added to the value of the high-probability counter of the storage unit 132.

The control unit 131 then executes a free game process (S27). This free game process allows the player to play the slot game without the consumption of coins. As such, in the present embodiment, when the winning of the BONUS is established and the right to execute the free game is awarded, the number of times of execution of the high-probability game is randomly determined in the high-probability game execution number random determination process in S26. For this reason, the shift to the high-probability game always occurs after the end of the free game in S27. With this arrangement, when the right to execute the free game is awarded as a benefit, the number of times of execution of the high-probability game after the shift from the normal game to the high-probability game is easily adjustable, and hence the burden on the game provider is reduced in connection with the adjustment of the payout rates in the entire game.

Meanwhile, if the "BONUS" win is not achieved in S25 (NO in S25) or after S27, the routine proceeds to S11.

According to the arrangement above, whether to shift to the high-probability game in which the high-probability symbol random determination process (third random determination) using the high-probability game video reels is executed is determined based on a result of the independent high-probability game shifting random determination process (first random determination), irrespective of (not depending on) a result of the normal symbol random determination process (second random determination) in the normal game. With this arrangement, the probability of shifting from the normal game to the high-probability game is easily adjustable. On this account, the burden on the game provider is reduced in connection with the adjustment of the payout rates in the entire game.

(Bet/Start-Check Process)

Now, the bet/start-check process will be described with reference to FIG. 10.

To begin with, the control unit 131 permits acceptance of a bet button operation by pressing the "+" or "−" button (see FIG. 3) of the bet button 244 of the operation display area 24 through the touch panel 5 (S41). As the number of coins betted on a unit game is selected, a payout of that unit game is calculated by multiplying the number of coins by a payout shown in FIG. 8.

Subsequently, the control unit 131 determines whether the bet button 244 is operated (pressed) (S42). When an operation of the bet button 244 is not detected (NO in S42), an operation is waited for.

Meanwhile, when an operation of the bet button 244 is detected (YES in S42), the control unit 131 adds the number of betted coins to the value of the bet counter in the storage unit 132 (S43).

Subsequently, after S43, the control unit 131 allows the spin button 241 to accept an operation (S44).

After S44, the control unit 131 determines whether or not an operation of the spin button 241 is detected (S45). When the control unit 131 determines that an operation of the spin button 241 is not detected (NO in S45), an operation of the spin button 241 is waited for. As described above, by the game program, the spin button 241 in the operation display area 24 on the display 120 moves in the operation display area 24 in response to an input to the touch panel 5. In this way, an input to the spin button 241 is detected.

Meanwhile, when the control unit 131 determines that an operation of the spin button 241 is detected (YES in S45), the control unit 131 subtracts the value of the bet counter calculated in S43 from the value of the coin counter in the storage unit 132 (S46). Then the bet/start check process is terminated.

(Free Game Process)

Figure 12:
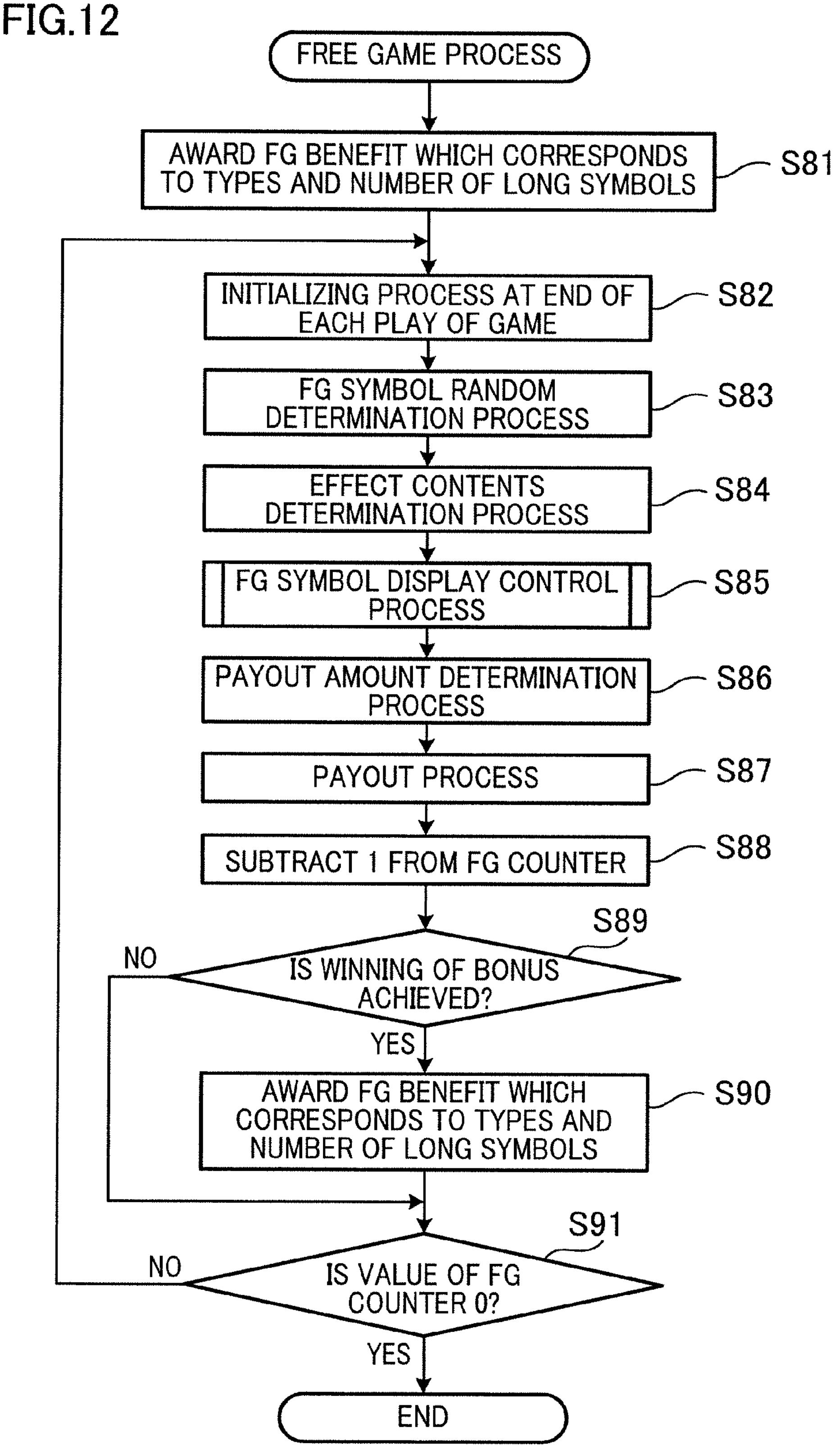
FIG. 12 is a flowchart of a free game process.

The following describes a free game process with reference to FIG. 12.

To begin with, at the result determination for the BONUS in S25, the control unit 131 awards a free game benefit which corresponds to the types and number of the long symbols displayed in the symbol display area 21 (S81). To be more specific, as described above, in accordance with the number of displayed long symbols "BANANA", a payout calculated by multiplying the number of betted coins by a multiplying factor (which is 1 when the number of coins is 0, 1 when the number of coins is 1, 2 when the number of coins is two, 5 when the number of coins is three, and 10 when the number of coins is four) is awarded. Furthermore, in accordance with the number of displayed long symbols "GRAPE", the number of times of execution of the free game is determined (5 times when the number of long symbols is 0, 5 times when the number of long symbols is one, 8 times when the number of long symbols is two, 12 times when the number of long symbols is three, and 20 times when the number of long symbols is four). Furthermore, in accordance with the number of displayed long symbols "PLUM", a payout rate in the free game is determined (1 when the number of long symbols is 0, 1 when the number of long symbols is one, 2 when the number of long symbols is two, 5 when the number of long symbols is three, and 10 when the number of long symbols is four).

Figure 15:
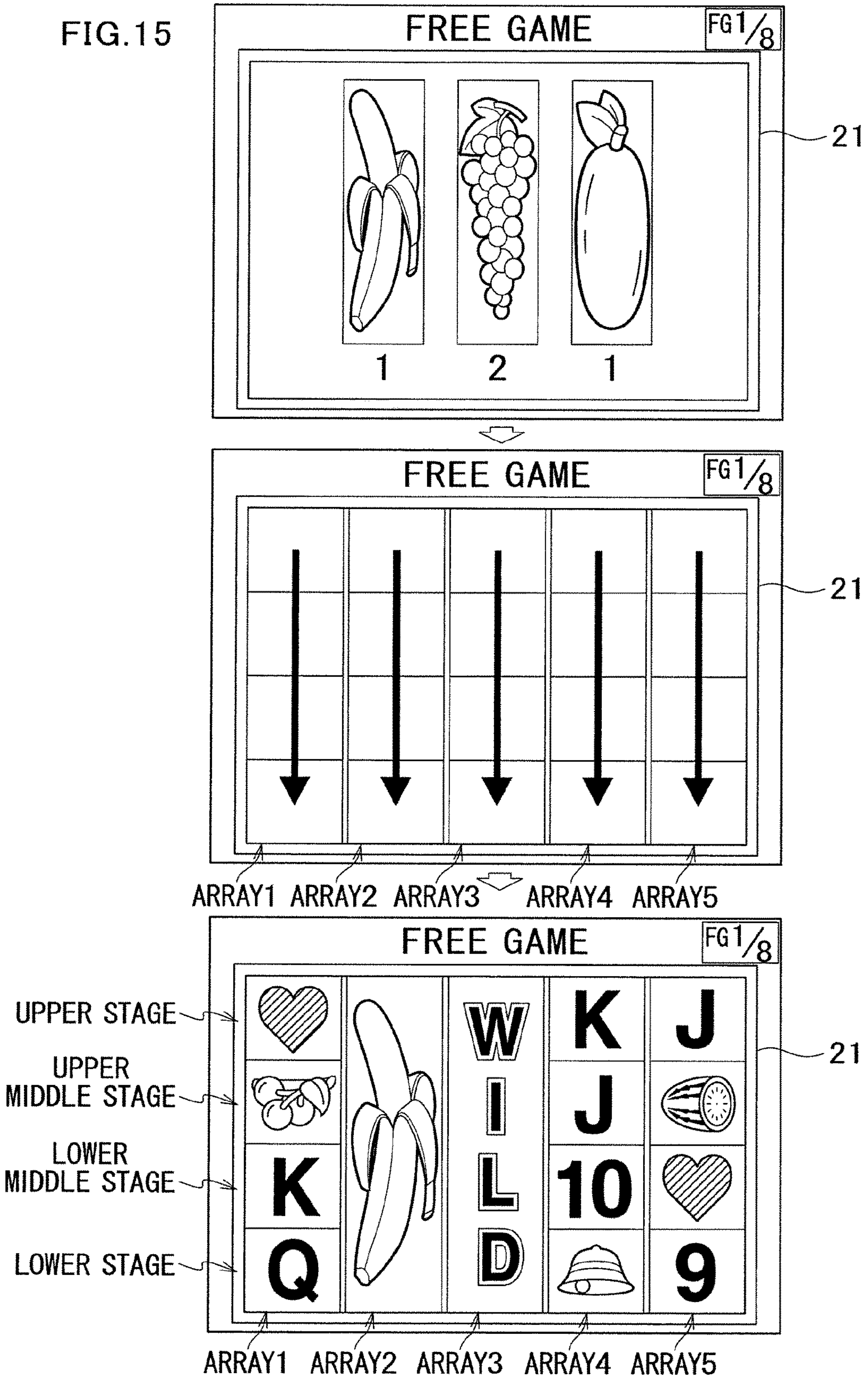
FIG. 15 illustrates a free game displayed on the display.

For example, when one long symbol "BANANA", two long symbols "GRAPE", and one long symbol "PLUM" are displayed in the symbol display area 21 at the result determination for the BONUS as shown in FIG. 14, the types and number of the long symbols displayed in the symbol display area 21 are displayed on the display 120 at the result determination for the BONUS as shown in FIG. 15. In accordance with the one long symbol "BANANA", a payout calculated by multiplying the number of betted coins by 1 is awarded. In accordance with the two long symbols "GRAPE", the number of times of execution of the free game is determined as 8 (i.e., 8 is added to the FG counter). Furthermore, in accordance with the one long symbol "PLUM", the payout rate in the free game is determined as 1.

Subsequently, the control unit 131 executes an initializing process at the end of each play of the game, in order to start the slot game in the free game (S82). For example, this process clears data in a working area of the storage unit 132, which becomes unnecessary at the end of each play of the unit game, e.g., symbols to be displayed on the symbol display area 21 as a result of random determination in the previous unit game. The value of the bet counter of the storage unit 132 is identical with the value in the slot game control process.

Then, the control unit 131 executes an FG symbol random determination process (S83). In this process, by using the free game video reels shown in FIG. 7, to-be-stopped symbols are randomly selected from symbols provided on the video reels (REEL1, REEL2, REEL3, REEL4, and REEL5). The to-be-stopped symbols are data of five symbols to be displayed in the upper stage of each column of the symbol display area 21, out of the symbols forming each video reel. In this way, 20 symbols displayed in the symbol display area 21 are determined.

The control unit 131 stores the determined five to-be-stopped symbols in a symbol storing area in the storage unit 132.

Subsequently, the control unit 131 executes an effect contents determination process (S84). The control unit 131 samples an effect-use random number and randomly selects any of a plurality of predetermined effect contents.

Then, the control unit 131 executes the FG symbol display control process (S85). In the FG symbol display control process, as shown in FIG. 15, five video reels are scrolled in the symbol display area 21 of the smartphone 1. After a predetermined time elapses, the five to-be-stopped symbols determined in the symbol random determination process in S83 are stopped one by one in the upper stage of each column of the symbol display area 21. That is, 20 symbols including the to-be-stopped symbols are displayed in the symbol display area 21. For example, when the "HEART" symbol is selected as a to-be-stopped symbol in the REEL1, the "BANANA" long symbol is selected as a to-be-stopped symbol in the REEL2, the "WILD" long symbol is selected as a to-be-stopped symbol in the REEL3, the KING" symbol is selected as a to-be-stopped symbol in the REEL4, and the "JACK" symbol is selected as a to-be-stopped symbol in the REEL5, the symbols are provided in the symbol display area 21, as shown in FIG. 15.

Subsequently, the control unit 131 executes a payout amount determination process (S86). In this process, whether three or more symbols of the same type successively stop on a payline (see FIG. 4) of the symbol display area 21 and a win is achieved is determined based on the symbol combination table for the slot game (see FIG. 8), which is stored in the storage unit 132. In accordance with the type of win, a benefit will be given in the form of awarding a payout and the like. The payout awarded is stored in a payout amount storage area of the storage unit 132.

Then the control unit 131 executes a payout process (S87). The control unit 131 adds a value stored in the payout amount storage area of the storage unit 132 to a value stored in the coin counter provided in the storage unit 132. For example, when "300" is stored in the payout amount storage area in the payout amount determination process in S86, "300" is added to the value of the coin counter.

The control unit 131 then subtracts 1 from the value of the FG counter in the storage unit 132 (S88).

Subsequently, the control unit 131 determines whether the winning of the BONUS is established (i.e., the long symbol "GRAPE", "BANANA", or "PLUM" stops in each of the arrays 1 to 4 of the symbol display area 21 and a long symbol "BONUS" stops in the array 5) (S89). When a "BONUS" win is achieved (YES in S89), the control unit 131 awards a free game benefit corresponding to the types and number of the long symbols displayed in the symbol display area 21 at the result determination for the BONUS in S89, in the same manner as in S81 (S90).

If the "BONUS" win is not achieved in S89 (NO in S89) or after S90, the control unit 131 determines whether the value of the FG counter of the storage unit 132 is 0 (S91). When the value of the FG counter is not 0 (NO in S91), the routine proceeds to S82. When the value of the FG counter is 0 (YES in S91), the routine is terminated.

OTHER EMBODIMENTS

While in the embodiment above the slot game is executed by the server 100, the slot game may be, as game software (a program and game data), installed in and executed by an information processor. Examples of the information processor include mobile information devices such as a smartphone, a portable computer, a laptop computer, a note PC, a tablet PC, a handheld PC, and a PDA (Personal Data Assistant). The game software by which the slot game is executed is downloaded from a server or the like via communication means and stored in a storage device (e.g., a flash memory) in the mobile information device. The communication means may be an interactive communication passage such as the Internet and a cable TV, or may be one-way broadcasting.

The game software by which the slot game is executed may be stored in a recording medium such as a CD-ROM, a DVD-ROM, an MO (optical magnetic disc), and a flash memory, and may be read from the recording medium and installed in a storage device of a information processor such as the server 100 and the smartphone 1, according to need.

According to another embodiment, the game software may be a game program executed by a computer. In this case, the game program executes the following processes when the computer (either the server 100 or the smartphone 1) executes the normal game in which a benefit is awarded as a result of random determination and the high-probability game in which a predetermined benefit is more likely to be awarded than in the normal game.

(a) The control unit 131 executes the high-probability game shifting random determination process (S15) of determining whether to use the high-probability game video reels with which the probability of winning the BONUS is high as compared to the normal game video reels.

(b) When the high-probability game video reels are not selected in the high-probability game shifting random determination process (NO in S15), the control unit 131 sets the normal game video reels shown in FIG. 5 in the normal game setting process (S64) and executes the normal symbol random determination process (S65).

(c) When the high-probability game video reels are selected in the high-probability game shifting random determination process (YES in S15), the control unit 131 sets the high-probability game video reels shown in FIG. 6 in the high-probability game setting process (S16) and executes the high-probability symbol random determination process (S18).

(d) When the BONUS is won as a result of the normal symbol random determination process (S65) or the high-probability symbol random determination process (S18), the control unit 131 awards the BONUS (execution of the free game) (S25 and S27).

At this stage, under the control of the game program, a spin button 241 (game element) in the operation display area 24 of the display 120 (display device) is movable in the operation display area 24 in response to an input to the touch panel 5. Furthermore, in response to an input to the touch panel 5, a route display 241A of the spin button 241 may be displayed to elongate (or shorten) the movement direction 241B, and when the input to the touch panel 5 is finished (i.e., the finger is removed from the touch panel 5), the spin button 241 may be moved in the movement direction 241B. The above-described processes (a) to (d) may be executed after the spin button 241 moves in the movement direction 241B.

In another embodiment, the game program may be stored in a non-transitory computer readable recording medium such as a CD-ROM, a DVD-ROM, an MO (Magneto-Optical disk), and a flash memory.

In this case, the game program causes the information processor, which executes the normal game in which a benefit is awarded as a result of random determination and the high-probability game in which a predetermined benefit is more likely to be awarded than in the normal game, to execute the processes described in the embodiment above.

The processes (computer processes) executed in the embodiment above may be executed either by the server 100 or the smartphone 1, and the processes are suitably shared between the server 100 and the smartphone 1.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

What is claimed is:

1. An information processor which executes a normal game in which a benefit is awarded as a result of random determination and a high-probability game in which a predetermined benefit is more likely to be awarded than in the normal game, comprising:

a storage unit configured to store random determination tables which include a normal game random determination table and a high-probability game random determination table with which the probability of awarding the predetermined benefit is higher than in the normal game random determination table;

a setting unit configured to set one of the random determination tables stored in the storage unit; and a controller which is programmed to execute the processes of:

(a) executing first random determination of determining whether to set the high-probability game random determination table;

(b) when it is determined in the first random determination in the process (a) not to set the high-probability game random determination table, causing the setting unit to set the normal game random determination table as a random determination table used in the normal game and executing second random determination based on the normal game random determination table;

(c) when it is determined in the first random determination in the process (a) to set the high-probability game random determination table, causing the setting unit to set the high-probability game random determination table as a random determination table used in the high-probability game and executing third random determination based on the high-probability game random determination table; and (d) when the predetermined benefit is to be awarded as a result of the second random determination or the third random determination, awarding the predetermined benefit;

wherein determination of whether to set the high-probability game random determination table in the process (a) is independent of results of the second random determination and independent of results of the third random determination.

2. The information processor according to claim 1, wherein the controller is configured to further execute the processes of:

(e) when it is determined in the first random determination in the process (a) to set the high-probability game random determination table, determining the number of times of execution of the high-probability game in fourth random determination; and causing the high-probability game to be repeatedly executable in the third random determination in the process (c) the number of times determined in the fourth random determination.

3. The information processor according to claim 2, wherein the predetermined benefit is right to execute a special game which is different from the normal game and the high-probability game, and the controller is configured to further execute the processes of:

when the right to execute in free game is awarded in the process (d) as a result of the second random determination or the third random determination, executing the special game;

(f) after execution of the special game, determining the number of times of execution of the high-probability game in the fourth random determination; and causing the high-probability game to be repeatedly executable in the third random determination in the process (c) the number of times determined in the fourth random determination.

4. The information processor according to claim 3, wherein the number of times of execution of the high-probability game in the fourth random determination is two or more times.

5. The information processor according to claim 2, wherein the number of times of execution of the high-probability game in the fourth random determination is two or more times.

6. The information processor according to claim 1, wherein the predetermined benefit is right to execute a special game which is different from the normal game and the high-probability game, and the controller is configured to further execute the processes of:

when the right to execute in free game is awarded in the process (d) as a result of the second random determination or the third random determination, executing the special game;

(f) after execution of the special game, determining the number of times of execution of the high-probability game in the fourth random determination; and causing the high-probability game to be repeatedly executable in the third random determination in the process (c) the number of times determined in the fourth random determination.

7. The information processor according to claim 6, wherein the number of times of execution of the high-probability game in the fourth random determination is two or more times.

8. The information processor according to claim 1, further comprising a display, wherein normal game reel strips on which symbols are arranged are set in the normal game random determination table, a lengthy symbol in which two or more predetermined symbols are successively provided is arranged on each of the normal game reel strips in the normal game random determination table, symbols displayed on the display are selected in the second random determination from the symbols arranged on the normal game reel strips, and the benefit is awarded based on a combination of the symbols displayed on the display, and high-probability reel strip on which symbols are arranged are set in the high-probability game random determination table, the number of lengthy symbols on each of the high-probability reel strips is larger than on each of the normal game reel strips in the high-probability game random determination table, symbols displayed on the display are selected in the third random determination from the symbols arranged on the high-probability reel strips, and the benefit is awarded based on a combination of the symbols displayed on the display.

9. The information processor according to claim 1, wherein the second random determination, when executed, is used to select symbols to be displayed on the display as a result of execution of the normal game;

the third random determination, when executed, is used to select symbols to be displayed on the display as a result of execution of the high-probability game; and the determination of whether to set the high-probability game random determination table in the process (a) is independent of symbols determined to be displayed by the second random determination and independent of symbols determined to be displayed by the third random determination.

10. The information processor according to claim 1, wherein the first random determination is performed (i) after the normal game starts when a normal game is executed and after the high-probability game starts when a high-probability game is executed, and (ii) before the second random determination is performed when a normal game is executed and before the third random determination is performed when a high-probability game is executed for an initial time.

11. A game program executed by a computer when the computer executes a normal game with which a benefit is awarded as a result of random determination and a high-probability game in which a predetermined benefit is more likely to be awarded than in the normal game, the game program executing the processes of:

(a) causing a setting unit to execute first random determination of determining whether to set a high-probability game random determination table with which the probability of awarding the predetermined benefit is higher than in a normal game random determination table;

(b) when it is determined in the first random determination in the process (a) not to set the high-probability game random determination table, causing the setting unit to set the normal game random determination table as a random determination table used in the normal game and executing second random determination based on the normal game random determination table;

(c) when it is determined in the first random determination in the process (a) to set the high-probability game random determination table, causing the setting unit to set the high-probability game random determination table as a random determination table used in the high-probability game and executing third random determination based on the high-probability game random determination table; and (d) when the predetermined benefit is to be awarded as a result of the second random determination or the third random determination, awarding the predetermined benefit.

* * * * *